(12) United States Patent
Reich et al.

(10) Patent No.: US 10,259,320 B1
(45) Date of Patent: Apr. 16, 2019

(54) SYSTEMS AND METHODS FOR PARKING PAWL DISENGAGEMENT

(71) Applicant: GM GLOBAL TECHNOLOGY OPERATIONS LLC, Detroit, MI (US)

(72) Inventors: Dennis M. Reich, Howell, MI (US); Scott C. Mrdeza, Lennon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 40 days.

(21) Appl. No.: 15/783,412

(22) Filed: Oct. 13, 2017

(51) Int. Cl.
*B60K 28/10* (2006.01)
*F16H 59/54* (2006.01)
*F16H 59/66* (2006.01)

(52) U.S. Cl.
CPC ............ *B60K 28/10* (2013.01); *F16H 59/54* (2013.01); *F16H 59/66* (2013.01); *F16H 2059/663* (2013.01); *F16H 2306/40* (2013.01)

(58) Field of Classification Search
USPC .......................................................... 701/53
See application file for complete search history.

(56) References Cited

U.S. PATENT DOCUMENTS 8,868,305 B2 * 10/2014 Jang .................... F16H 61/0059
701/1
9,020,712 B2 * 4/2015 Koike ................. B60W 10/184
701/53

\* cited by examiner

*Primary Examiner* — Dirk Wright

(57) ABSTRACT

An exemplary method to disengage a brake transmission shift interlock feature of a vehicle includes the steps of receiving vehicle characteristic data from at least one vehicle sensor, determining a current road grade, determining a vehicle brake pressure target, receiving vehicle brake pressure data from at least one vehicle sensor, and generating a control signal to disengage the brake transmission shift interlock feature if the vehicle brake pressure reaches the vehicle brake pressure target.

20 Claims, 2 Drawing Sheets

SYSTEMS AND METHODS FOR PARKING PAWL DISENGAGEMENT

INTRODUCTION

The present invention relates generally to the field of vehicles and, more specifically, to systems and methods for parking pawl disengagement to reduce dynamic driveline torque events.

A parking pawl is a device fitted to an automatic transmission of a motor vehicle that locks up the transmission when the transmission shift lever is placed in the Park position. The parking pawl locks the transmission's output shaft to the transmission casing by engaging a pawl with a notched wheel on output shaft, stopping the shaft, and thus the driven wheels, from rotating. However, excessive dynamic driveline torque events ("torque spike") can result from automatic transmission parking pawl disengagement when the vehicle is shifted out of Park on a nonzero road grade.

SUMMARY

Embodiments according to the present disclosure provide a number of advantages. For example, embodiments according to the present disclosure control a vehicle braking system to reduce excessive dynamic driveline torque events when a brake transmission shift interlock feature of a vehicle is disengaged when the vehicle is parked on an incline.

In one aspect, a method to disengage a brake transmission shift interlock feature of a vehicle includes the steps of receiving, by a vehicle controller, vehicle characteristic data from at least one vehicle sensor, determining, by the vehicle controller, a current road grade, determining, by the vehicle controller, a vehicle brake pressure target, receiving, by the vehicle controller, a vehicle brake pressure from at least one vehicle sensor, and generating, by the vehicle controller, a control signal to disengage the brake transmission shift interlock feature if the vehicle brake pressure reaches the vehicle brake pressure target.

In some aspects, receiving vehicle characteristic data includes receiving one or more of a transmission gear status, a vehicle inclination/declination angle, a tow condition, GPS position data of a location of the vehicle, and a vehicle load weight.

In some aspects, receiving vehicle characteristic data includes verifying a transmission gear status is in a PARK position and determining a current road grade includes analyzing GPS position data of a current location of the vehicle.

In some aspects, determining a current road grade includes receiving sensor data from an inertial measurement unit of the vehicle.

In some aspects, determining a current road grade includes receiving GPS position data of a current location of the vehicle.

In some aspects, the method further includes determining, by the vehicle controller, a predetermined road grade threshold.

In some aspects, the method further includes comparing, by the vehicle controller, the current road grade to the predetermined road grade threshold.

In some aspects, generating a control signal to disengage the brake transmission shift interlock feature includes generating the control signal if the current road grade exceeds the predetermined road grade threshold.

In some aspects, determining a vehicle brake pressure target includes calculating the vehicle brake pressure target based on a tow condition, a vehicle weight, and the current road grade.

In some aspects, the method further includes determining, by the vehicle controller, a current brake pedal position and a brake pedal position target and generating, by the vehicle controller, a control signal to disengage the brake transmission shift interlock feature if the current brake pedal position exceeds the brake pedal position target.

In another aspect, a method to disengage a brake transmission shift interlock feature of a vehicle includes the steps of receiving, by a vehicle controller, sensor data indicating a transmission gear status, determining, by the vehicle controller, a current road grade and a predetermined road grade threshold, comparing, by the vehicle controller, the current road grade to the predetermined road grade threshold, determining, by the vehicle controller, a vehicle brake pressure target, receiving, by the vehicle controller, a vehicle brake pressure from at least one vehicle sensor, and generating, by the vehicle controller, a control signal to disengage the brake transmission shift interlock feature if the transmission gear status is in a park position, the current road grade exceeds the predetermined road grade threshold, and the vehicle brake pressure reaches the vehicle brake pressure target.

In some aspects, determining a current road grade includes receiving GPS position data of a current location of the vehicle.

In some aspects, determining a vehicle brake pressure target includes calculating the vehicle brake pressure target based on a tow condition, a vehicle weight, and the current road grade.

In some aspects, the method further includes determining, by the vehicle controller, a current brake pedal position and a brake pedal position target and generating, by the vehicle controller, a control signal to disengage the brake transmission shift interlock feature if the current brake pedal position exceeds the brake pedal position target.

In yet another aspect, a system for disengaging a brake transmission shift interlock feature of a vehicle includes at least one vehicle sensor, a vehicle brake control system; and an electronic controller in electronic communication with the at least one vehicle sensor and with the vehicle brake control system. The electronic controller is configured to receive sensor data from the at least one vehicle sensor indicating a transmission gear status, determine a current road grade and a road grade threshold, compare the current road grade to the road grade threshold, determine a vehicle brake pressure target, receive a vehicle brake pressure from the at least one vehicle sensor, and generate a control signal to disengage the brake transmission shift interlock feature if the transmission gear status is in a PARK position, the current road grade exceeds the road grade threshold, and the vehicle brake pressure reaches the vehicle brake pressure target.

In some aspects, the controller is further configured to determine a current brake pedal position and a brake pedal position target and generate a control signal to disengage the brake transmission shift interlock feature if the current brake pedal position exceeds the brake pedal position target.

In some aspects, determining a vehicle brake pressure target includes calculating the vehicle brake pressure target based on a tow condition, a vehicle weight, and the current road grade.

In some aspects, determining a current road grade includes receiving GPS position data of a current location of the vehicle.

In some aspects, the controller is further configured to receive vehicle characteristic data including one or more of a vehicle type, a vehicle weight, a tow condition, and a vehicle load weight.

In some aspects, determining a road grade threshold includes determining the road grade threshold based on one or more of the vehicle type, the vehicle weight, the tow condition, and the vehicle load weight.

BRIEF DESCRIPTION OF THE DRAWINGS

The present disclosure will be described in conjunction with the following figures, wherein like numerals denote like elements.

Figure 1:
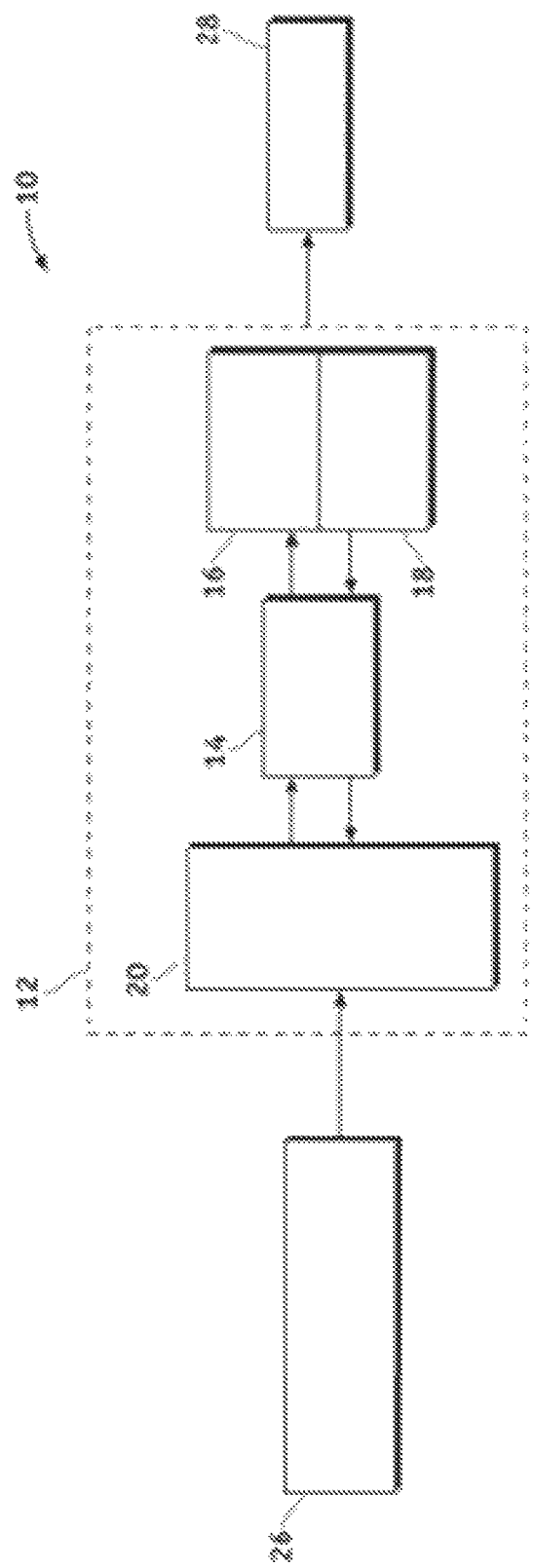
FIG. 1 is a block diagram of a system for disengaging a Brake Transmission Shift Interlock feature of a vehicle and mitigating dynamic driveline torque events, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

A vehicle automatic transmission includes a Brake Transmission Shift Interlock (BTSI) feature. The BTSI feature is designed to prohibit movement of the transmission shift lever from the PARK position unless the ignition switch is disposed in the RUN position and the brake pedal is depressed.

In some embodiments, the automatic transmission includes a parking pawl. The parking pawl is a device fitted to the automatic transmission to lock the transmission when the transmission shift lever is placed in the PARK position. When a vehicle is parked on a non-zero grade, disengagement of the parking pawl may cause an excessive dynamic driveline torque ("torque spike") event. In some embodiments, a vehicle controller receives sensor data regarding vehicle characteristics such as, for example and without limitation, whether the vehicle is parked on a road grade, the weight of the vehicle, a tow status, etc., and based on the sensor data, implements a method to activate the vehicle's braking system to preserve driveline system hardware during disengagement of the BTSI feature on a non-zero road grade.

FIG. 1 illustrates an exemplary system 10 for controlling the disengagement of the BTSI feature of an automatic transmission. Once vehicle conditions are detected that may lead to a driveline torque dynamic event, in some embodiments, the system 10 directs various components 28 of the vehicle, including the parking pawl and the vehicle brake control system, to apply or maintain pressure in the vehicle brakes and/or trailer brakes, then to disengage the parking pawl and minimize the torque dynamic event effect on the vehicle driveline. A processor/controller device 12 includes a central processing unit (CPU) 14 coupled to memory devices 16 and 18, which can include such memory as random access memory (RAM) 16, non-volatile read only memory (NVROM) 18, and possibly other mass storage devices. The CPU 14 is coupled through an input/output (I/O) interface 20 to at least one of a plurality of sensors 26 which provide operational data from a vehicle, such as transmission gear status, vehicle speed, vehicle load weight, vehicle tow condition (that is, whether the vehicle is towing a trailer, for example and without limitation), vehicle inclination/declination angle, vehicle brake pressure, GPS position data of a current location of the vehicle, brake pedal position, etc., to the CPU 14. The sensors 26 may be configured to measure various operational parameters of the vehicle as will be further described. In some embodiments, the CPU 14 is coupled through the I/O interface 20 to an inertial measurement unit (IMU) including one or more sensors 26.

Figure 2:
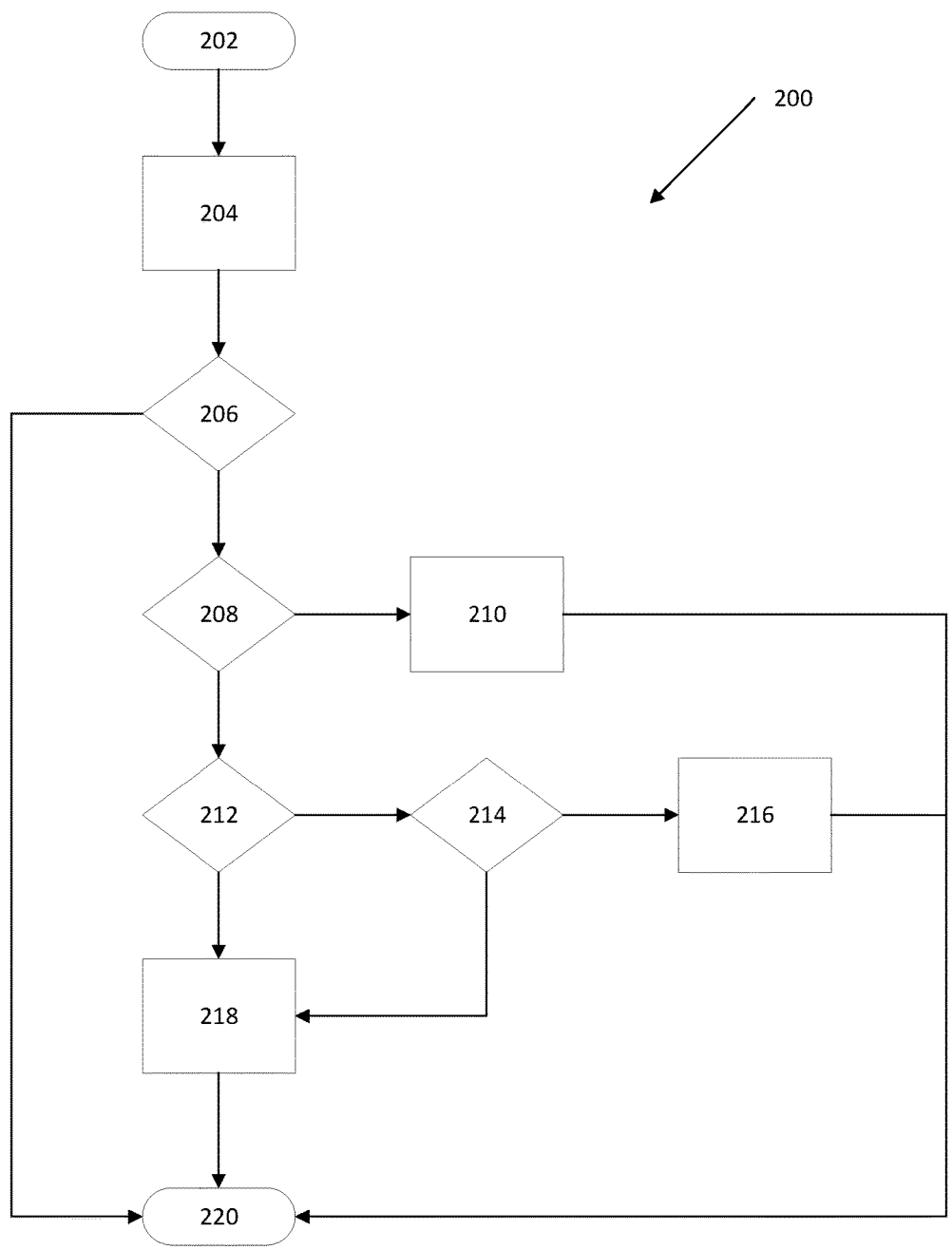
FIG. 2 is a flow diagram of a method for disengaging a Brake Transmission Shift Interlock feature of a vehicle and mitigating dynamic driveline torque events, according to an embodiment.

FIG. 2 illustrates an exemplary method 200 for disengaging a BTSI feature including a parking pawl to minimize a driveline torque dynamic event. The method 200 can be utilized in connection with the system 10 having one or more sensors 26. The order of operation of the method 200 is not limited to the sequential execution as illustrated in FIG. 2 but may be performed in one or more varying orders, or steps may be performed simultaneously, as applicable in accordance with the present disclosure.

In some embodiments, measured vehicle characteristic data, such as, for example and without limitation, transmission gear status, vehicle inclination/declination status, vehicle weight/load status, and tow condition, are used by a controller, such as the controller 12, to determine if the vehicle is stopped or parked on an inclined road surface such that disengagement of the parking pawl would result in a "torque spike" event that could cause damage to driveline components. In some embodiments, based on the input received from one or more of the sensors 26, the controller 12 determines whether to disengage the BTSI feature upon receipt of a brake light indicator signal. In some embodiments, the controller 12 determines a vehicle brake pressure target and/or a brake pedal position target and disengages the parking pawl when the brake pedal position reaches a target position or the brake pressure reaches a target value. In some embodiments, using predetermined inclination/declination data, the controller 12 determines a target amount of vehicle brake pressure and transmits a signal to the vehicle brake control system to apply the target amount of vehicle brake pressure prior to disengagement of the parking pawl.

The method 200 begins at 202 and proceeds to 204. At 204, the controller 12 receives data from one or more of the sensors 26. In some embodiments, that data received includes one or more of a transmission gear status, a vehicle inclination/declination angle to inform the controller of the current road grade, GPS data of a current location of the vehicle, a tow condition, and a vehicle load weight, for example and without limitation.

Next, at 206, the controller 12 determines whether the transmission is in the PARK position. The controller 12 receives the transmission gear status from one of the sensors 26. If the transmission is not in park, the parking pawl of the BTSI feature is not engaged and the method 200 proceeds to 220 and ends.

However, if the transmission is in the PARK position, the BTSI feature is engaged and the method 200 proceeds to 208. At 208, the controller 12 determines whether the current road grade exceeds a predetermined threshold. In some embodiments, the current road grade is determined from vehicle inclination/declination angle data, which is obtained, in some embodiments, from sensors 26 of a vehicle inertial measurement unit (IMU). In some embodiments, the current road grade is determined from global positioning system (GPS) data of the current vehicle location. In some embodiments, the predetermined road grade threshold is the road grade at which the controller 12 determines that a torque spike event is likely if the parking pawl is disengaged. In some embodiments, the predetermined road grade threshold depends on the vehicle type, vehicle weight, vehicle load weight, and vehicle towing status, among other factors, for example and without limitation. If the measured road grade obtained from the vehicle sensor data does not exceed the predetermined road grade threshold, the method 200 proceeds to 210.

At 210, the controller 12 transmits a signal authorizing BTSI disengagement. The controller 12 transmits the authorization signal upon receipt of a signal from the brake light system indicating that the operator has depressed the brake pedal such that the brake lights illuminate. The authorization signal is received, in some embodiments, by an actuator or controller in electronic or mechanical communication with the parking pawl of the BTSI feature such that receipt of the authorization signal triggers release of the parking pawl. At 210, generation of the disengagement authorization signal by the controller 12 is associated with the brake light illumination signal, rather than a brake pressure target value. Once the BTSI disengagement is complete at 210, the method 200 proceeds to 220 and ends.

If the current road grade, determined at 208, exceeds the predetermined road grade threshold, the method 200 proceeds to 212. At 212, the controller 12 determines a vehicle tow condition. The vehicle tow condition includes, in some embodiments, whether a trailer is connected to the vehicle. The tow condition is determined, in some embodiments, via receipt of a signal from one of the sensors 26 and may include a signal indicating a brake light connection to a trailer, for example and without limitation.

If the tow condition indicates that the vehicle is not towing a trailer, or the vehicle tow condition cannot be determined from the sensor data, the method 200 proceeds to 214. At 214, the controller 12 determines whether a tow or haul mode of operation is selected. In some embodiments, the vehicle includes a tow/haul selector interface that may be manually activated by the vehicle operator. The tow/haul selector interface allows the vehicle operator to indicate whether the vehicle is hauling a load or towing a trailer, for example and without limitation.

If the tow/haul selector interface is not activated, the method 200 proceeds to 216. At 216, the controller 12 determines the brake pressure target value and/or the brake pedal target position to disengage the BTSI feature based on a gross vehicle weight rating (GVWR) condition. The GVWR includes the weight of the vehicle (chassis, body, engine, etc.) as well as a driver, passengers, and any cargo, but excludes the weight of a trailer. Under the GVWR condition, the brake pressure target value and/or the brake pedal target position determined by the controller 12 is based on the maximum vehicle/platform GVWR. Once the brake pressure target value and/or the brake pedal target position is achieved, either by depression of the brake pedal by the vehicle operator and/or via autonomous operation of the braking system via the controller 12, the controller 12 generates and transmits a signal authorizing BTSI disengagement. The authorization signal is received, in some embodiments, by an actuator or controller in electronic or mechanical communication with the parking pawl of the BTSI feature such that receipt of the authorization signal triggers release of the parking pawl. After disengagement of the BTSI feature and release of the parking pawl, the method 200 proceeds to 220 and ends.

However, if a tow condition is positively determined at 212, that is, that the vehicle is towing a trailer, or the tow/haul selector interface is activated as determined at 214, the method 200 proceeds to 218. At 218, the controller 12 determines the brake pressure target value and/or the brake pedal target position to disengage the BTSI feature based on a gross combined weight rating (GCWR) condition. The GCWR includes the weight of the vehicle (chassis, body, engine, etc.) as well as a driver, passengers, cargo in the tow vehicle, and trailer weight and cargo. Under the GCWR condition, the brake pressure target value and/or the brake pedal target position determined by the controller 12 is based on the maximum vehicle/platform GCWR. Once the brake pressure target value and/or the brake pedal target position is achieved, either by depression of the brake pedal by the vehicle operator and/or via autonomous operation of the braking system via the controller 12, the controller 12 generates and transmits a signal authorizing BTSI disengagement. The authorization signal is received, in some embodiments, by an actuator or controller in electronic or mechanical communication with the parking pawl of the BTSI feature such that receipt of the authorization signal triggers release of the parking pawl. After disengagement of the BTSI feature and release of the parking pawl, the method 200 proceeds to 220 and ends.

In some embodiments, the brake pressure target value and/or the brake pedal target position is optimized to protect driveline hardware while minimizing the disturbance or inconvenience to the operator (that is, for example, the amount of force the operator exerts on the brake pedal during parking pawl disengagement when the vehicle is parked on a road grade). In some embodiments, the brake pressure target value is achieved through depression of the brake pedal by the operator, via autonomous control of the vehicle brake control system by the controller 12, or by some combination of manual depression of the brake pedal and autonomous control of the vehicle brake control system.

In some embodiments, the brake pressure target value is a tunable parameter based on the vehicle type/configuration, any detected load or tow condition, etc.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method to disengage a brake transmission shift interlock feature of a vehicle, the method comprising:
   receiving, by a vehicle controller, vehicle characteristic data from at least one vehicle sensor;
   determining, by the vehicle controller, a current road grade;
   determining, by the vehicle controller, a vehicle brake pressure target;
   receiving, by the vehicle controller, a vehicle brake pressure from at least one vehicle sensor; and
   generating, by the vehicle controller, a control signal to disengage the brake transmission shift interlock feature if the vehicle brake pressure reaches the vehicle brake pressure target.

2. The method of claim 1, wherein receiving vehicle characteristic data comprises receiving one or more of a transmission gear status, a vehicle inclination/declination angle, a tow condition, GPS position data of a location of the vehicle, and a vehicle load weight.

3. The method of claim 1, wherein receiving vehicle characteristic data comprises verifying a transmission gear status is in a PARK position and determining a current road grade comprises analyzing GPS position data of a current location of the vehicle.

4. The method of claim 1, wherein determining a current road grade comprises receiving sensor data from an inertial measurement unit of the vehicle.

5. The method of claim 1, wherein determining a current road grade comprises receiving GPS position data of a current location of the vehicle.

6. The method of claim 1, further comprising determining, by the vehicle controller, a predetermined road grade threshold.

7. The method of claim 6, further comprising comparing, by the vehicle controller, the current road grade to the predetermined road grade threshold.

8. The method of claim 7, wherein generating a control signal to disengage the brake transmission shift interlock feature comprises generating the control signal if the current road grade exceeds the predetermined road grade threshold.

9. The method of claim 1, wherein determining a vehicle brake pressure target comprises calculating the vehicle brake pressure target based on a tow condition, a vehicle weight, and the current road grade.

10. The method of claim 1, further comprising determining, by the vehicle controller, a current brake pedal position and a brake pedal position target and generating, by the vehicle controller, a control signal to disengage the brake transmission shift interlock feature if the current brake pedal position exceeds the brake pedal position target.

11. A method to disengage a brake transmission shift interlock feature of a vehicle, the method comprising:
   receiving, by a vehicle controller, sensor data indicating a transmission gear status;
   determining, by the vehicle controller, a current road grade and a predetermined road grade threshold;
   comparing, by the vehicle controller, the current road grade to the predetermined road grade threshold;
   determining, by the vehicle controller, a vehicle brake pressure target;
   receiving, by the vehicle controller, vehicle brake pressure data from at least one vehicle sensor; and
   generating, by the vehicle controller, a control signal to disengage the brake transmission shift interlock feature if the transmission gear status is in a park position, the current road grade exceeds the predetermined road grade threshold, and the vehicle brake pressure reaches the vehicle brake pressure target.

12. The method of claim 11, wherein determining a current road grade comprises receiving GPS position data of a current location of the vehicle.

13. The method of claim 11, wherein determining a vehicle brake pressure target comprises calculating the vehicle brake pressure target based on a tow condition, a vehicle weight, and the current road grade.

14. The method of claim 11, further comprising determining, by the vehicle controller, a current brake pedal position and a brake pedal position target and generating, by the vehicle controller, a control signal to disengage the brake transmission shift interlock feature if the current brake pedal position exceeds the brake pedal position target.

15. A system for disengaging a brake transmission shift interlock feature of a vehicle, comprising:
   at least one vehicle sensor;
   a vehicle brake control system; and
   an electronic controller in electronic communication with the at least one vehicle sensor and with the vehicle brake control system, the electronic controller configured to
   receive sensor data from the at least one vehicle sensor indicating a transmission gear status;
   determine a current road grade and a road grade threshold;
   compare the current road grade to the road grade threshold;
   determine a vehicle brake pressure target;
   receive vehicle brake pressure data from the at least one vehicle sensor; and
   generate a control signal to disengage the brake transmission shift interlock feature if the transmission gear status is in a PARK position, the current road grade exceeds the road grade threshold, and the vehicle brake pressure reaches the vehicle brake pressure target.

16. The system of claim 15, wherein the controller is further configured to determine a current brake pedal position and a brake pedal position target and generate a control signal to disengage the brake transmission shift interlock feature if the current brake pedal position exceeds the brake pedal position target.

17. The system of claim 15, wherein determining a vehicle brake pressure target comprises calculating the vehicle brake pressure target based on a tow condition, a vehicle weight, and the current road grade.

18. The system of claim 15, wherein determining a current road grade comprises receiving GPS position data of a current location of the vehicle.

19. The system of claim 15, wherein the controller is further configured to receive vehicle characteristic data comprising one or more of a vehicle type, a vehicle weight, a tow condition, and a vehicle load weight.

20. The system of claim 19, wherein determining a road grade threshold comprises determining the road grade threshold based on one or more of the vehicle type, the vehicle weight, the tow condition, and the vehicle load weight.

\* \* \* \* \*